US011102680B1

(12) United States Patent
Huang et al.

(10) Patent No.: US 11,102,680 B1
(45) Date of Patent: Aug. 24, 2021

(54) DATA TRANSFER INTERFACE WITH REDUCED SIGNALING

(71) Applicant: Marvell International Ltd., Hamilton (BM)

(72) Inventors: Frank Huang, Dublin, CA (US); Xinyu Zang, Palo Alto, CA (US); Benson Chau, Sunnyvale, CA (US); Tao Song, Shanghai (CN); Zheng Cao, Union City, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 83 days.

(21) Appl. No.: 16/427,573

(22) Filed: May 31, 2019

Related U.S. Application Data

(60) Provisional application No. 62/678,626, filed on May 31, 2018.

(51) Int. Cl.
*H04W 28/14* (2009.01)
*H04W 80/02* (2009.01)
*H04L 12/861* (2013.01)
*H04L 1/18* (2006.01)
*H04L 12/801* (2013.01)
*G06F 13/14* (2006.01)
*G06F 3/06* (2006.01)
*H04L 12/835* (2013.01)

(52) U.S. Cl.
CPC ........... *H04W 28/14* (2013.01); *H04L 1/1835* (2013.01); *H04W 80/02* (2013.01); *G06F 3/0656* (2013.01); *G06F 13/14* (2013.01); *H04L 47/14* (2013.01); *H04L 47/30* (2013.01); *H04L 49/90* (2013.01)

(58) Field of Classification Search
CPC ..... H04L 49/30–35; H04L 49/90–9094; H04L 1/1835–1838; H04L 1/1874–1877; H04L 47/30; H04L 47/722
See application file for complete search history.

(56) References Cited

U.S. PATENT DOCUMENTS

| 2009/0089459 | A1* | 4/2009 | Jeyaseelan | G06F 13/128 710/7 |
| 2010/0014437 | A1* | 1/2010 | Wang | G06F 11/1004 370/252 |
| 2010/0169528 | A1* | 7/2010 | Kumar | H04L 49/9094 710/263 |
| 2014/0359160 | A1* | 12/2014 | Elhaddad | H04L 47/32 709/238 |

(Continued)

*Primary Examiner* — Marcus Smith

(57) ABSTRACT

A wireless data transceiver includes a media access controller (MAC) that receives an inbound packet from an air interface and to buffer that packet for transport to a host, and receives an outbound packet and transfers that packet to the air interface. A host interface receives the inbound packet from the MAC and transfers the inbound packet to the host, and receives the outbound packet from the host for transfer to the MAC. Transport controller circuitry (TCC), including processing circuitry configured to execute instructions, manages the transceiver. Hardware data transport circuitry (HDTC) for transporting packets in either direction between the MAC and the host interface includes a buffer memory having a plurality of slots. The TCC or HDTC issues a start or stop signal to the host interface causing the HDTC and the host interface to begin or end transfer of data between the buffer memory and the host interface.

11 Claims, 6 Drawing Sheets

(56) References Cited

U.S. PATENT DOCUMENTS

2019/0140979 A1\* 5/2019 Levi .................... H04L 49/9068
2019/0207721 A1\* 7/2019 Hsu .................. G11B 20/10009
2019/0327178 A1\* 10/2019 Wu ......................... H04L 49/90

\* cited by examiner

DATA TRANSFER INTERFACE WITH REDUCED SIGNALING

CROSS REFERENCE TO RELATED APPLICATION

This disclosure claims the benefit of, commonly-assigned U.S. Provisional Patent Application No. 62/678,626, filed May 31, 2018, which is hereby incorporated by reference herein in its entirety.

FIELD OF USE

This disclosure relates to the transport of data between an interface and a host device. More particularly, this disclosure relates to data transport with reduced signaling.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

A data transceiver such as that used in a wireless system operating under the IEEE 802.11 protocol, commonly referred to as "Wireless Fidelity" or "WiFi," includes a media access controller (MAC) that interfaces with the wireless channel, and a host interface which may be, for example, a Universal Serial Bus (USB), Peripheral Component Interconnect-Express (PCIe), or Secure Digital Input Output (SDIO), interface. Traditionally, firmware has been provided to move packets between the MAC and the host interface. In an SDIO interface in particular, the firmware instructions include an exchange of bitmaps representing buffer slots to be written to or read from.

SUMMARY

A wireless data transceiver in accordance with implementations of the subject matter of this disclosure includes a media access controller configured to receive an inbound data packet from an air interface and to buffer the inbound data packet for transport to a host, and to receive an outbound data packet from elsewhere in the wireless data transceiver and to transfer the outbound data packet to the air interface, a host interface configured to receive the inbound data packet transported from the media access controller and to transfer the inbound data packet to the host, and to receive the outbound data packet from the host for transfer to the media access controller, transport controller circuitry configured to manage the wireless data transceiver, the transport controller circuitry comprising processing circuitry configured to execute instructions, and hardware data transport circuitry for transporting the inbound data packet from the media access controller to the host interface, and for transporting the outbound data packet from the host interface to the media access controller. The hardware data transport circuitry includes a buffer memory having a plurality of buffer slots for storing data received from the host interface for transfer to the media access controller, and for storing data received from the media access controller for transfer to the host interface. One of the transport controller circuitry and the hardware data transport circuitry issues a start signal to the host interface. Responsive to the start signal, the hardware data transport circuitry and the host interface begin a transfer of data between the buffer memory and the host interface, and transfer multiple data packets. One of the transport controller circuitry and the hardware data transport circuitry issues a stop signal to the host interface. Responsive to the stop signal the hardware data transport circuitry and the host interface end the transfer of data between the buffer memory and the host interface.

In a first implementation of such a wireless data transceiver, the host interface may be configured to operate in accordance with a protocol compatible with a Secure Digital Input Output (SDIO) host device.

In a second implementation of such a wireless data transceiver, direction of the transfer of data between the buffer memory and the host interface may be from the host interface to the buffer memory, the start signal may be a near-empty signal signifying that at least a first predetermined number of buffer slots are empty, and the stop signal may be a near-full signal signifying that at most a second predetermined number of buffer slots are empty, the second predetermined number being less than the first predetermined number.

In the second implementation of the wireless data transceiver, when data packets transferred from the host interface to the buffer memory before issuance of the near-full signal arrive after issuance of the near-full signal, the host interface may stop the transfer of data when the buffer memory is filled.

In the second implementation of the wireless data transceiver, after arrival of the near-full signal, the host interface may transfer at most a further amount of data sufficient to fill the second predetermined number of buffer slots to capacity, and then may stop transferring data.

In the second implementation of the wireless data transceiver, after transfer of data packets from the host interface to the buffer memory is stopped upon arrival of the near-full signal, the host interface may resume transfer of data packets from the host to the buffer memory on subsequent arrival of the near-empty signal.

In the second implementation of the wireless data transceiver, the one of the transport controller circuitry and the hardware data transport circuitry may issue at least one of (a) the near-empty signal and (b) the near-full signal as an interrupt.

In a third implementation of such a wireless data transceiver, direction of the transfer of data between the buffer memory and the host interface may be from the buffer memory to the host interface, and the one of the transport controller circuitry and the hardware data transport circuitry may issue the start signal to indicate receipt of a packet at the wireless data transceiver.

In the third implementation of the wireless data transceiver, the one of the transport controller circuitry and the hardware data transport circuitry may issue, as the start signal, a signal signifying that a packet has a non-zero packet length.

In the third implementation of the wireless data transceiver, the one of the transport controller circuitry and the hardware data transport circuitry may issue, as the stop signal, a signal, appended to a received packet, signifying that a packet has a zero packet length.

A method in accordance with implementations of the subject matter of this disclosure for operating a wireless data transceiver including a media access controller, transport controller circuitry, hardware data transport circuitry, and a host interface, includes, for an outbound data packet, receiving the outbound data packet at the host interface, and transferring the outbound data packet from the host interface to the media access controller via the hardware data transport circuitry, including storing the outbound data packet in a buffer slot in a buffer memory of the hardware data transport circuitry, the buffer memory having a plurality of buffer slots for storing data received from the host interface. The transferring the outbound data packet from the host interface to the buffer memory includes issuing a start signal to the host interface by the hardware data transport circuitry, and continuing transfer of one or more data packets, until issuance, by the hardware data transport circuitry, of a stop signal that indicates that further transfer should cease.

In a first implementation of the method, issuing the start signal may include issuing a near-empty signal signifying that at least a first predetermined number of buffer slots are empty, and issuing the stop signal may include issuing a near-full signal signifying that at most a second predetermined number of buffer slots are empty, the second predetermined number being less than the first predetermined number.

The first implementation of the method may further include, after arrival of the near-full signal, transferring by the host interface at most a further amount of data sufficient to fill the second predetermined number of buffer slots to capacity, and then stopping transfer of data.

The first implementation of the method may further include, when data packets transferred from the host interface to the buffer memory before issuance of the near-full signal arrive after issuance of the near-full signal, issuing a further stop signal to stop the transfer of data when the buffer memory is filled.

The first implementation of the method may further include, when transfer of data packets from the host interface to the buffer memory is stopped upon arrival of the near-full signal, resuming transfer of data packets from the host to the buffer memory upon arrival of the near-empty signal.

The first implementation of the method may include issuing at least one of the near-empty signal and the near-full signal as an interrupt.

A variant of the first implementation of the method may further include, for an inbound data packet, receiving the inbound data packet at the media access controller, transferring the inbound data packet from the media access controller to the host interface via the hardware data transport circuitry, including storing the inbound data packet in at least one of the buffer slots in the buffer memory of the hardware data transport circuitry. Transferring the inbound data packet from the buffer memory to the host interface may include issuing a start signal to the host interface by the hardware data transport circuitry, and continuing transfer of one or more data packets, until issuance, by the hardware data transport circuitry, of a stop signal that indicates that further transfer should cease.

In that variant, the issuing a start signal to the host interface by the hardware data transport circuitry may include issuing a signal indicating receipt of a packet at the wireless data transceiver. In such a variant, issuing a start signal to the host interface by the hardware data transport circuitry may further include issuing a signal signifying that a packet has a non-zero packet length. In such a variant, issuing a signal signifying that a packet has a non-zero packet length may include appending, to a received packet, the signal signifying that a packet has a non-zero packet length.

In that variant, issuing a stop signal to the host interface by the hardware data transport circuitry may include issuing a signal signifying that a packet has a zero packet length. In such a variant, issuing a signal signifying that a packet has a zero packet length may include appending, to a received packet, the signal signifying that a packet has a zero packet length.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
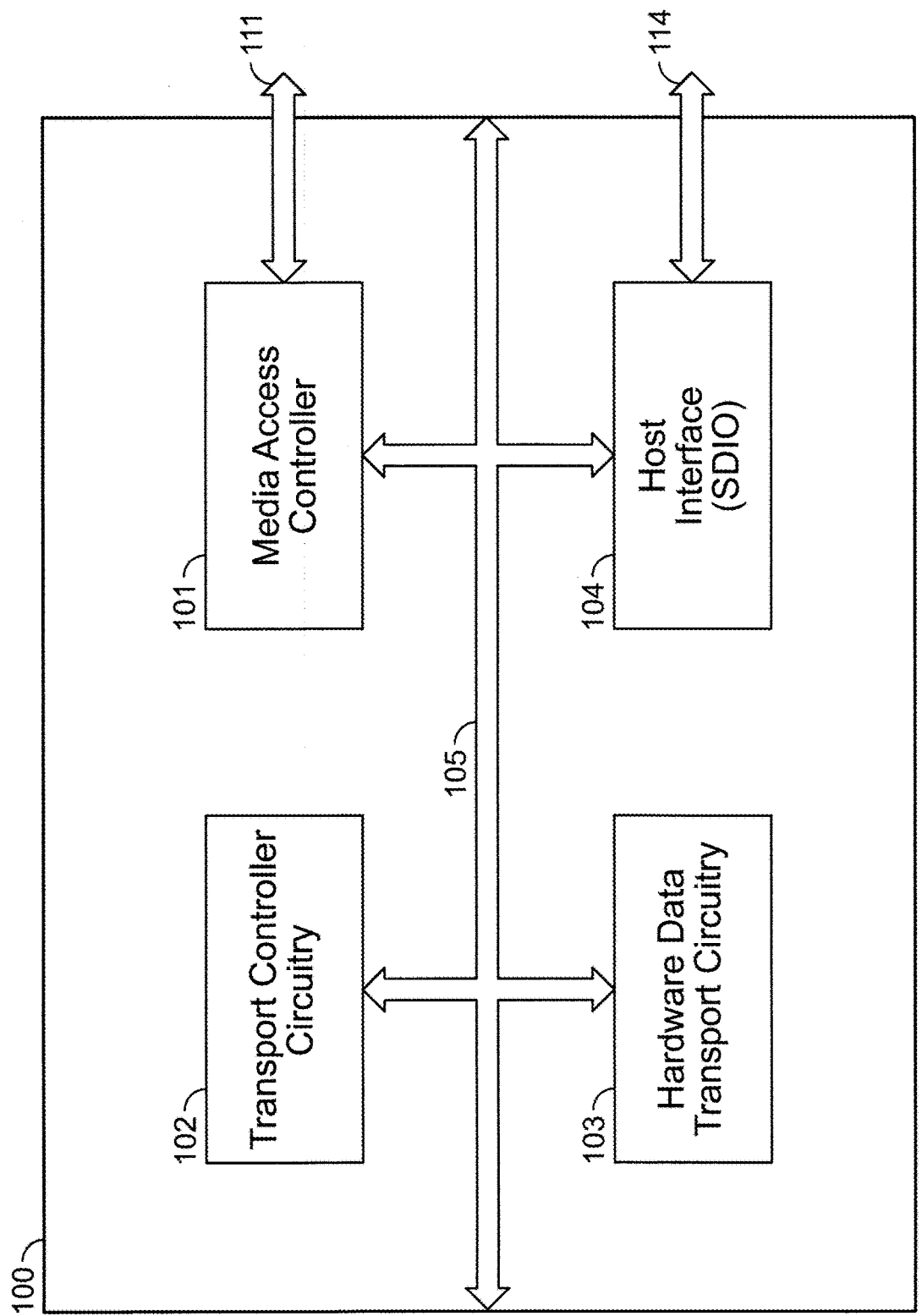
FIG. 1 is a high-level schematic diagram of a wireless data transceiver according to implementations of the subject matter of this disclosure.

The use of firmware to check and transport data packets between a MAC and a host interface can slow the effective data rate as the firmware instructions are executed. Wireless transceiver implementations have been proposed in which hardware data transport circuitry (HDTC) performs much of the data transport functions between a media access controller and a host interface, eliminating the need for firmware-based instructions for many functions. The hardware data transport circuitry may include a FIFO memory that communicates with the host interface, and a buffer memory that communicates with a media access controller. The buffer memory may be considered as a pool of buffer slots.

However, for certain types of host devices, the device protocol may include signaling that would overwhelm hardware data transport circuitry. In a Secure Data Input Output (SDIO) interface (of the type used with SD memory devices), for example, one interface protocol uses a bitmap to represent which slots of the buffer memory are available in the output or transmit direction, and which slots of the buffer memory contain data to be read in the input or receive direction. In a firmware-based transport controller, every time the bitmap is updated, an interrupt is issued and the bitmap is accessed by both the transport controller and the host interface. Replicating that functionality in hardware-based data transport circuitry would unnecessarily burden and complicate the hardware data transport circuitry.

In implementations according to the subject matter of this disclosure, time-consuming exchanges of bitmaps between the hardware data transport circuitry and the host interface are reduced or eliminated in favor of stop/start forms of signaling. These implementations involve only changes to transport controller functions, which may be implemented in firmware, without changing the functioning of the media access controller or the hardware data transport circuitry.

The hardware data transport circuitry has a buffer including a set of buffer slots that receive data from the host interface. In the transmit/output direction, rather than exchanging control signals or interrupts for each packet sent to a buffer slot, once the host interface begins transmitting, the host interface will keep transmitting until it receives a signal from the hardware data transport circuitry advising the host interface to stop transmitting. And once the host interface has stopped transmitting, the host interface will not transmit again until the host interface receives a signal from the hardware data transport circuitry indicating to the host interface that it can resume transmitting.

Specifically, in an implementation, while the host interface is transmitting packets into buffer slots of the hardware data transport circuitry, the host interface will continue transmitting packets without interruption, but when the number of available buffer slots falls below a lower threshold, the hardware data transport circuitry will send a signal to the host interface that the number of available buffer slots is low. At that point, the host interface either will stop transmitting, or will check, in a location maintained by the hardware data transport circuitry, the number of available buffer slots and will transmit only as much data as can be stored in the available buffer slots, and then stop transmitting.

In such an implementation, once the host interface has stopped transmitting packets to the hardware data transport circuitry, the hardware data transport circuitry will continue to move packets to the media access controller, freeing up buffer slots. When a sufficient number of buffer slots have thus been freed up, so that the number of available buffer slots exceeds an upper threshold, the hardware data transport circuitry will send a signal to the host interface, and the host interface can resume transmitting packets to the hardware data transport circuitry.

In some implementations, the upper and lower thresholds may be signaled in the form of interrupts.

The specific values of the upper and lower thresholds will vary depending on various factors related to each particular implementation. Those factors may include, without limitation, the number of buffer slots, the clock frequency of the system, and the desired level of service or fault tolerance.

In some implementations, in the transmit/output direction, if the lower threshold is not reached until relatively few buffer slots remain, and the system clock frequency is high, it may be possible that the signal or interrupt that signals that the lower threshold has been reached will not reach the host interface until sufficient outgoing packets from the host interface to at least fill all remaining buffer slots. If that happens, and the hardware data transport circuitry of the transceiver receives data from the host interface, the hardware data transport circuitry in such implementations responds to the host interface with a signal that no buffer space is available. The host interface will then stop transmitting, as though it had received a lower threshold signal, until it receives an upper threshold signal.

In the receive/input direction, transport controller circuitry (TCC) maintains a register that stores the length of a received packet. As described in more detail below, as long as that value is not zero, the host device will continue to read packets from the buffer of the hardware data transport circuitry. The value in the register will be added to the end of the packet read from the buffer, and then the register will be reset to zero. As soon as a new packet arrives, its length is entered in the register and added to the end of the next packet. Rather than exchanging signals or interrupts for each packet, the host interface will continue to read packets from the buffer of the hardware data transport circuitry until the host interface detects a zero at the end of a packet, meaning that no new packet has arrived at the hardware data transport circuitry. At that point the host interface will stop reading packets. When a new packet arrives after the host interface has stopped reading packets, the transport controller circuitry will send a signal, which may be a control signal or an interrupt, and the host interface will resume reading packets from the buffer of the hardware data transport circuitry.

An implementation of the subject matter of this disclosure may be described with reference to FIGS. 1-6.

The high-level structure of a wireless data transceiver 100, which may be a WiFi transceiver, according to implementations of the subject matter of this disclosure, is shown in FIG. 1. Wireless data transceiver 100 includes a media access controller (MAC) 101, transport controller circuitry 102, hardware data transport circuitry 103, and host interface 104, all interconnected by bus 105. Host interface 104, which may be an SDIO interface, is connected at 114 to an SDIO host device (not shown). MAC 101 receives and transmits data wirelessly via an "air interface," such as over a wireless local area network, at 111.

Figure 2:
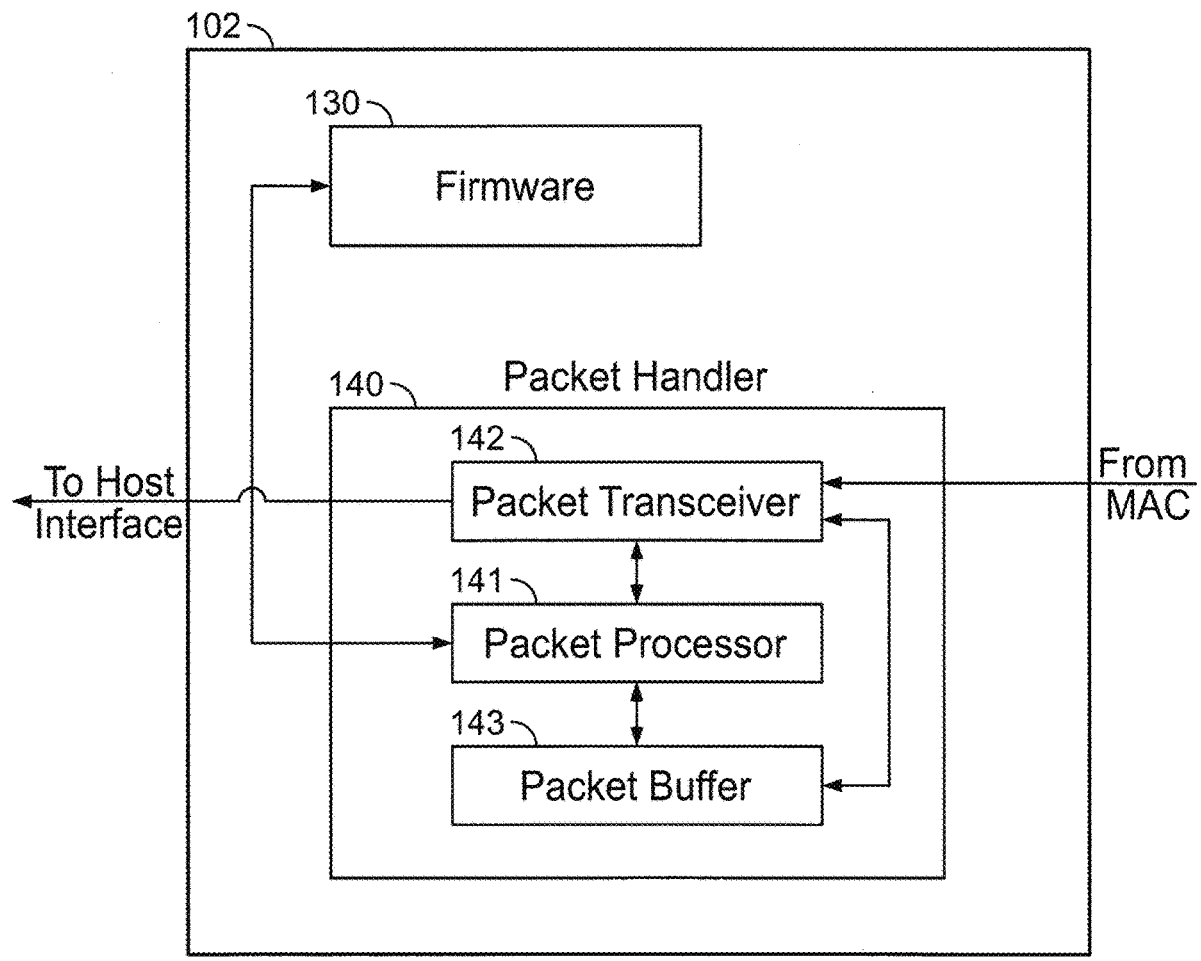
FIG. 2 is a block diagram of an example of transport controller circuitry in the wireless data transceiver of FIG. 1.

In an implementation shown in FIG. 2, transport controller circuitry 102 includes a packet handler 140, including a packet processor 141 that executes instructions that may be stored in firmware 130. In some implementations, packet processor 141 is a CPU. In other implementations, packet processor 141 is a microprocessor. In still other implementations, packet processor 141 is a microcontroller. Transport controller circuitry 102 performs management functions for wireless data transceiver 100, using packet processor 141 to execute instructions stored in firmware 130. Packets arrive at packet transceiver 142 of packet handler 140, and are stored in packet buffer 143 for processing by packet processor 141.

As described above, in some implementations, instructions executed by transport controller circuitry 102 are stored in firmware 130 for execution by packet processor 141. However, in other implementations, transport controller circuitry 102 is implemented in hardware (e.g., using appropriate logic circuitry, such as a field-programmable gate array or other suitable circuitry). Similarly, in some implementations, the program instructions executed in transport controller circuitry 102 are stored in other types of program memory. Although transport controller circuitry 102 may be considered to be executing firmware 130, implementations other than in firmware are within the scope of this disclosure, and discussion of firmware should not be considered as a limitation on the nature of transport controller circuitry 102.

Implementations of the subject matter of this disclosure involve the reduction in signaling between host interface 104 and hardware data transport circuitry 103. Such a reduction in signaling may be of particular importance when host interface 104 is an SDIO interface, because of the heavy signaling load involved in previously-known SDIO interfaces that may be difficult to implement in hardware data transport circuitry 103, and therefore difficult to implement without relying on slower instruction-based transport controller circuitry 102. A reduced signaling implementation according to the subject matter of the present disclosure can be implemented in hardware data transport circuitry 103, allowing reduced reliance on slower instruction-based transport controller circuitry 102, although the subject matter of the present disclosure also can be implemented using an instruction-based approach in transport controller circuitry 102.

Figure 3:
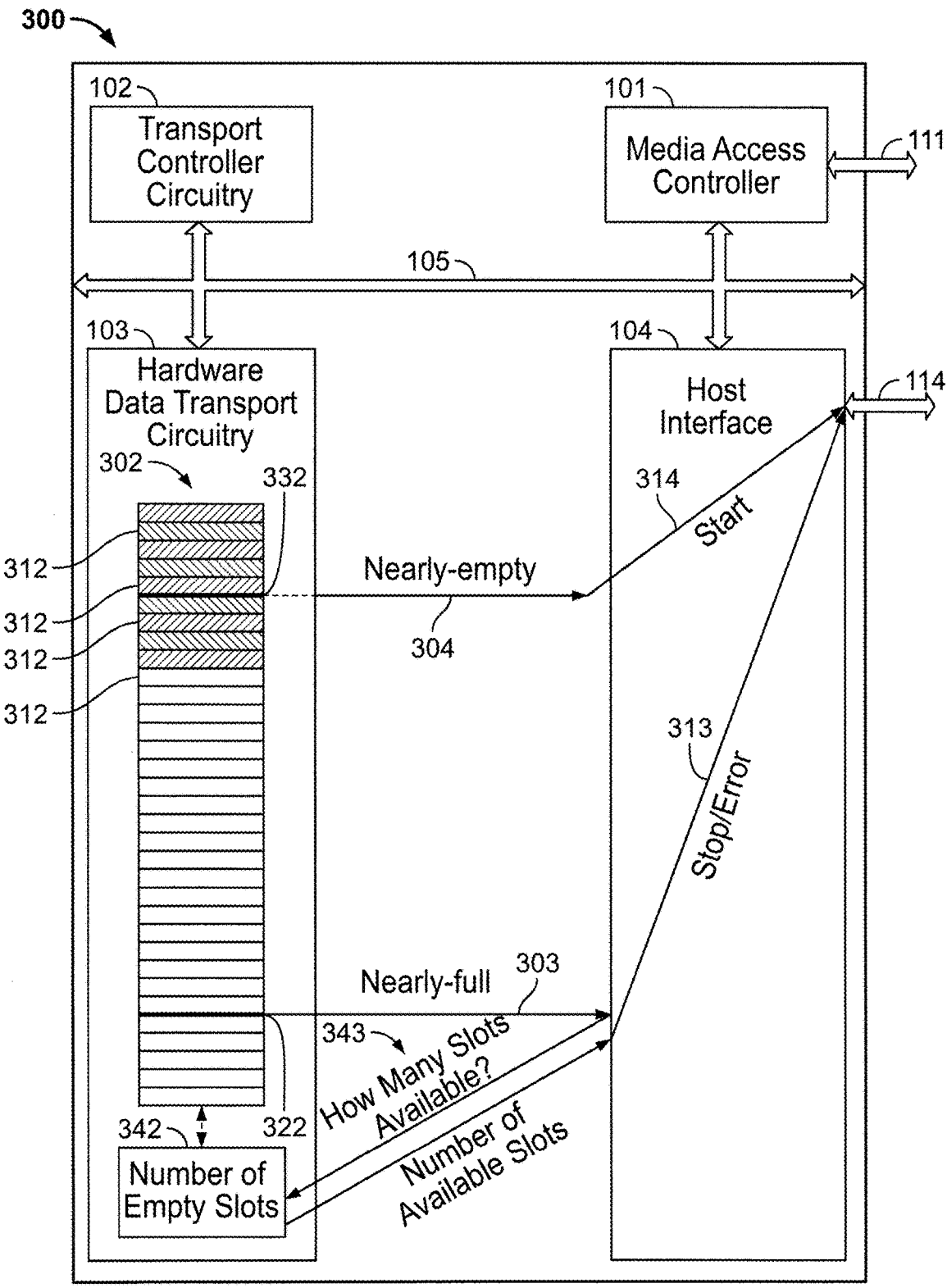
FIG. 3 is a diagram of the data and signal flow for outgoing data according to implementations of the subject matter of this disclosure, such as in the wireless data transceiver of FIG. 1.

FIG. 3 shows the operation of an implementation 300 of the subject matter of this disclosure in the transmit direction—i.e., from a host to an air interface. Such an implementation may be understood with reference to hardware data transport circuitry 103 and host interface 104 (as well as the unseen host at 114), without regard to media access controller 101 or transport controller circuitry 102.

In implementation 300, hardware data transport circuitry 103 includes a buffer 302 including a plurality of buffer slots 312. As the host sends packets via host interface 104 toward MAC 101 for transmission onto the air interface, the packets are stored temporarily by hardware data transport circuitry 103 in buffer 302. Buffer slots 312 of buffer 302 may be considered to fill up from top to bottom as drawn (although the buffer may not have any specific linear orientation and the actual storage pattern may be random). Thus, the shaded ones of slots 312 at the "top" of buffer 302 represent slots that are full, while the unshaded ones of slots 312 at the "bottom" of buffer 302 represent slots that are empty.

In accordance with this implementation, as the number of empty ones of slots 312 decreases to a lower threshold 322, signifying that the number of empty buffer slots 312 is low, meaning that buffer 302 is nearly full, hardware data transport circuitry 103 sends a "nearly-full" signal 303 to host interface 104. "Nearly-full" signal 303 acts as a stop signal, causing host interface 104 to stop sending packets toward hardware data transport circuitry 103.

Once host interface 104 has received the "nearly-full" signal (or "stop signal") 303, and has stopped sending packets toward hardware data transport circuitry 103, hardware data transport circuitry 103 continues to send packets from buffer 302 to MAC 101, lowering the occupancy of buffer 302, emptying from bottom to top in the orientation shown in FIG. 3. When the number of empty buffer slots 312 becomes sufficiently high, reaching an upper threshold 332, meaning that buffer 302 is nearly empty, hardware data transport circuitry 103 sends a "nearly-empty" signal 304 to host interface 104. "Nearly-empty" signal 304 acts as a start (or restart) signal, causing host interface 104 to start (or restart) sending packets toward hardware data transport circuitry 103.

Implementations of the subject matter of this disclosure thus, in the transmit direction, replace the constant complex querying and rewriting of a bitmap, as was done in previously-known SDIO interfaces, with the exchange of two signals at relatively infrequent intervals. The two signals are the nearly-empty signal signifying that at least a first predetermined number of buffer slots are empty, and the nearly-full signal signifying that at most a second predetermined number of buffer slots are empty, the second predetermined number being less than the first predetermined number. That is, transfers stop when a small number of slots are empty, and start or resume when a larger number of slots are empty.

In accordance with such implementations, when host interface 104 receives a nearly-full signal 303, host interface 104 may further relay stop signal 313 to the host, so that the host stops trying to send packets to host interface 104 that host interface 104 is unable to process. Depending on the level of activity of the host, the system clock, and other factors, packets may have already been sent to host interface 104 before the host becomes aware of stop signal 313. Therefore, upon receipt of nearly-full signal 303, host interface 104 in some implementations examines at 343 a storage location 342 (which may, for example, be a memory register) maintained by hardware data transport circuitry 103 that stores a value representative of the amount of space available in buffer 302. If there is insufficient space to store all packets already received at host interface 104 from the host, host interface 104 sends a stop/error signal 313 back to the host.

In some such implementations, host interface 104 stores as many of the received packets as it can in the available slots 312 of buffer 302, sending an error indication as part of signal 313 to the host only as to the remaining packets that cannot be stored in buffer 302. The host then stops sending packets until advised by host interface 104 that transfer of packets can resume (e.g., by host interface 104 relaying restart signal 314 to the host once nearly-empty signal 304 is received), at which point the host begins by resending the failed packets.

In other such implementations, if there is insufficient space to store all packets already received at host interface 104 from the host, then none of packets already received at host interface 104 from the host are stored (even though there is space available to store some of the packets), and host interface 104 sends an error indication as part of signal 313 to the host with respect to all of the packets not yet stored in buffer 302. Again, the host then stops sending packets until advised by host interface 104 that transfer of packets can resume (e.g., by host interface 104 sending restart signal 314 to the host once restart signal 304 is received), at which point the host begins by resending the larger number of failed packets.

Figure 4:
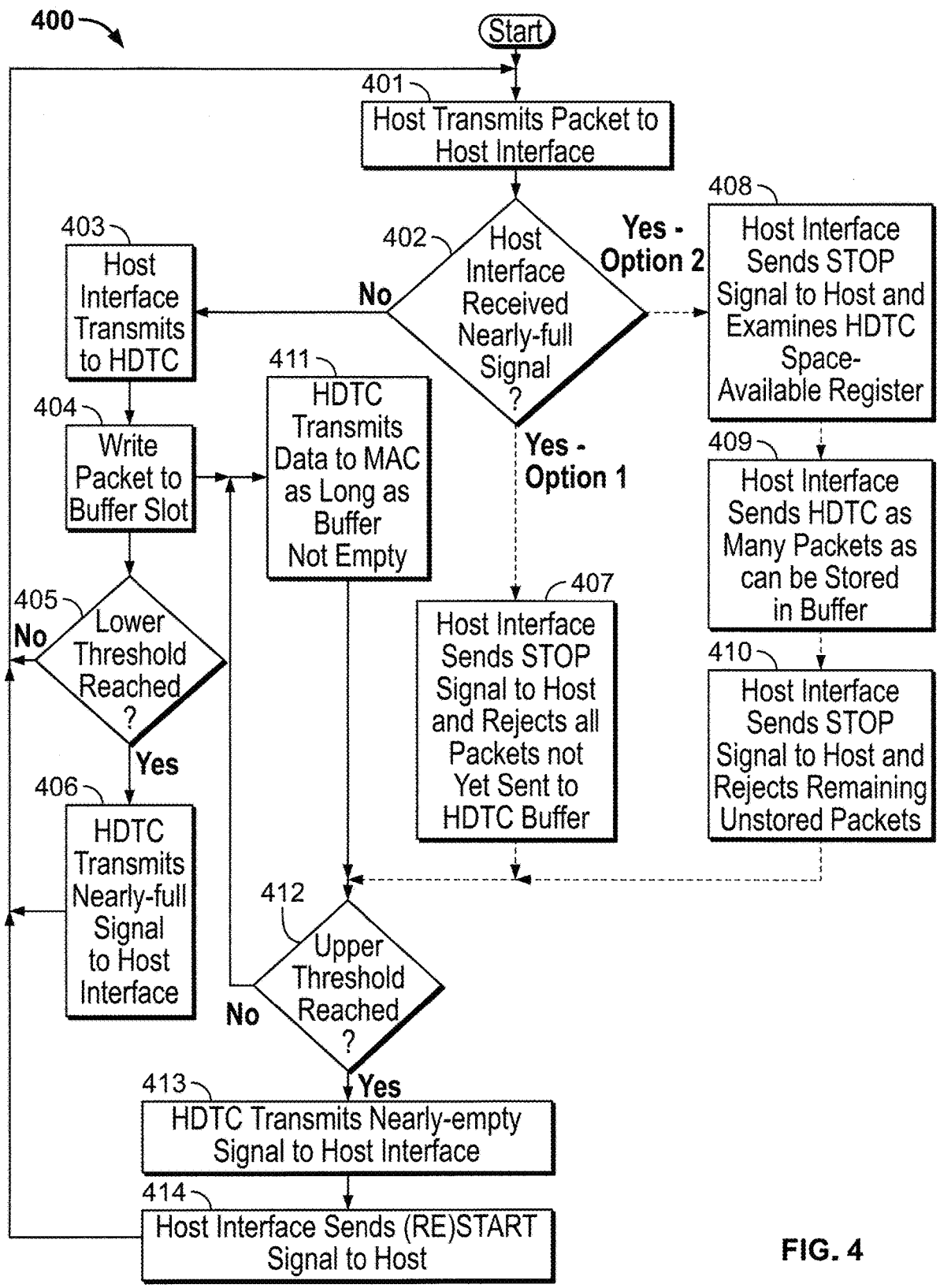
FIG. 4 is a flow diagram showing the operation of a transceiver in accordance with implementations of the subject matter of this disclosure in the transmit direction, such as in the wireless data transceiver of FIG. 1.

An implementation 400 of operation of the subject matter of the present disclosure in the transmit direction is diagrammed in FIG. 4.

At 401, host interface 104 receives a data packet from a host for transmission to MAC 101 and onto the air interface. At 402, it is determined whether host interface 104 has received a nearly-full signal from hardware data transport circuitry 103. If not, then at 403 host interface 104 transmits the data packet to hardware data transport circuitry 103. At 404, the data packet is written to a buffer slot 312 and then at 405 it is determined whether a lower threshold of buffer 302 has been reached. If not, flow returns to 401 where another packet is received by host interface 104. If at 405 it is determined that the lower threshold of buffer 302 has been reached, then at 406 hardware data transport circuitry 103 transmits a nearly-full signal to host interface 104, and flow returns to 401 where another packet is received by host interface 104.

If at 402 it is determined that host interface 104 has received a nearly-full signal from hardware data transport circuitry 103, then there are two options. According to Option 1, at 407, host interface 104 sends a STOP signal to the host, and rejects all packets that have not yet been written into buffer 302, even if some empty slots 312 remain. According to Option 2, at 408, host interface 104 sends a STOP signal to the host, and examines space-available register 342 in hardware data transport circuitry 103. At 409, host interface 104 sends to hardware data transport circuitry 103 as many packets as can be stored in buffer 302 according to the data in space-available register 342, and then at 410 host interface 104 sends a stop SIGNAL to hardware data transport circuitry 103 and rejects any packets that it received but that have not yet been stored in buffer 302.

After a data packet has been written to buffer 320 at 404, at 411 hardware data transport circuitry 103 transmits data from buffer 302 (assuming there is data in buffer 302) to MAC 101. Insofar as the transmission of data from buffer 302 serves to reduce the occupancy of buffer 302, after the transmission at 411 it is determined at 412 whether the upper threshold 332 (indicating low occupancy) of buffer 302 has been reached. If not, flow returns to 411 for transmission of further packets from buffer 302.

If at 412 it is determined that the upper threshold (indicating low occupancy) of buffer 302 has been reached, then at 413 hardware data transport circuitry 103 transmits a nearly-empty signal to host interface 104, which at 414 sends a RESTART signal to the host, and flow returns to 401.

As can be seen in implementation 400, once transmission of packets from hardware data transport circuitry 103 to MAC 101 begins at 411, transmission continues without exchange of interrupts or signals until upper threshold 332 is reached.

Operation of the subject matter of the present disclosure is different in the receive direction, as compared to the transmit direction. As described above, in the receive direction, the transport controller circuitry maintains a register that stores the length of a received packet. As long as that value is not zero, the host device will continue to read packets from the buffer of the hardware data transport circuitry. The value in the register will be added to the end of the packet read from the buffer, and then the register will be reset to zero. As soon as a new packet arrives, its length is entered in the register and added to the end of the next packet. Thus, data added to the end of each packet acts as a signal, telling the host interface whether or not to read any packets after the current packet. Adding data to the end of each packet replaces the previously-known exchange of signals or interrupts. Host interface 104 can simply continue reading another packet until it sees a zero-length indication at the end of a current packet.

Figure 5:
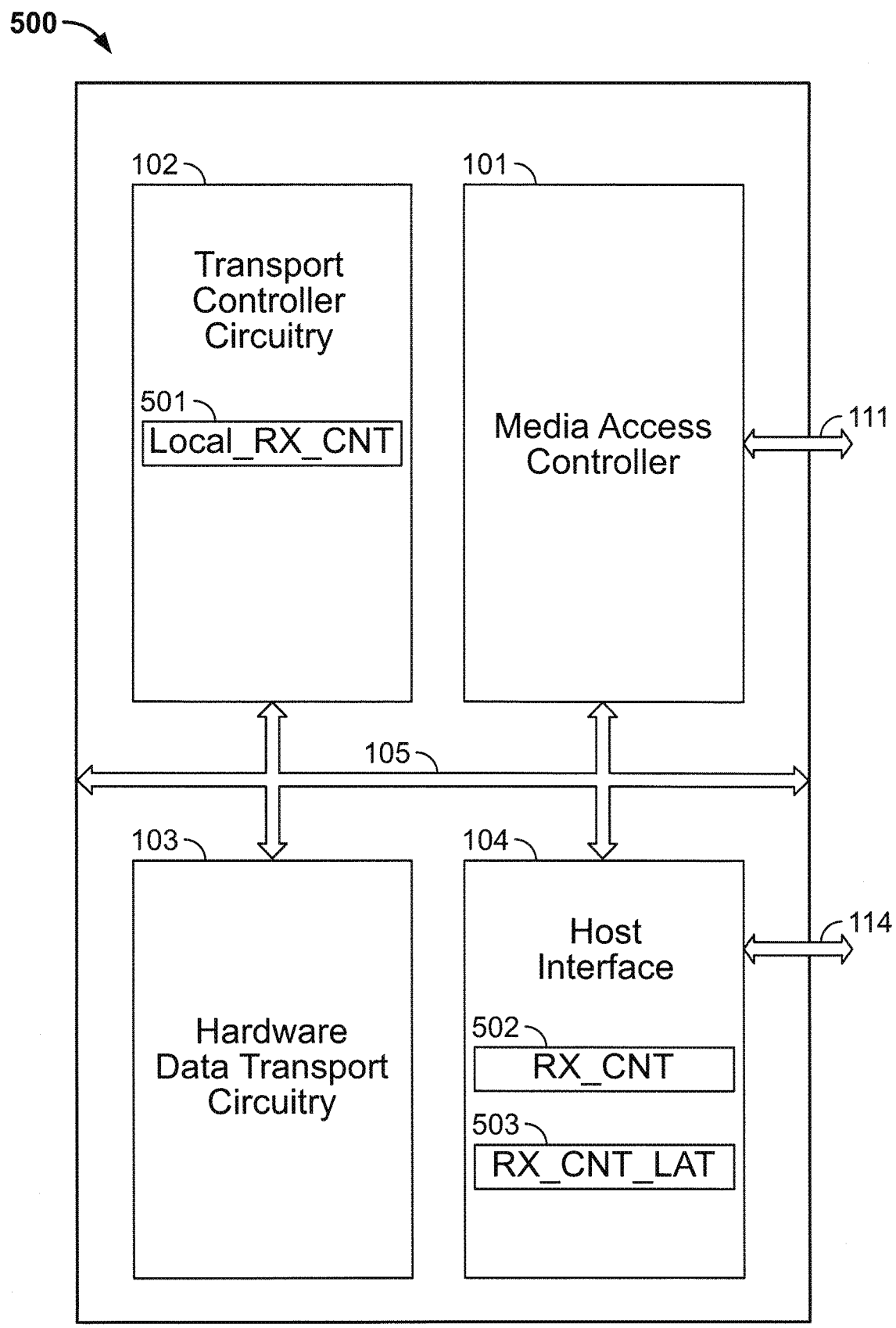
FIG. 5 is a high-level schematic diagram, similar to FIG. 1, of a wireless data transceiver, showing registers used in the receive direction, according to implementations of the subject matter of this disclosure.
Figure 6:
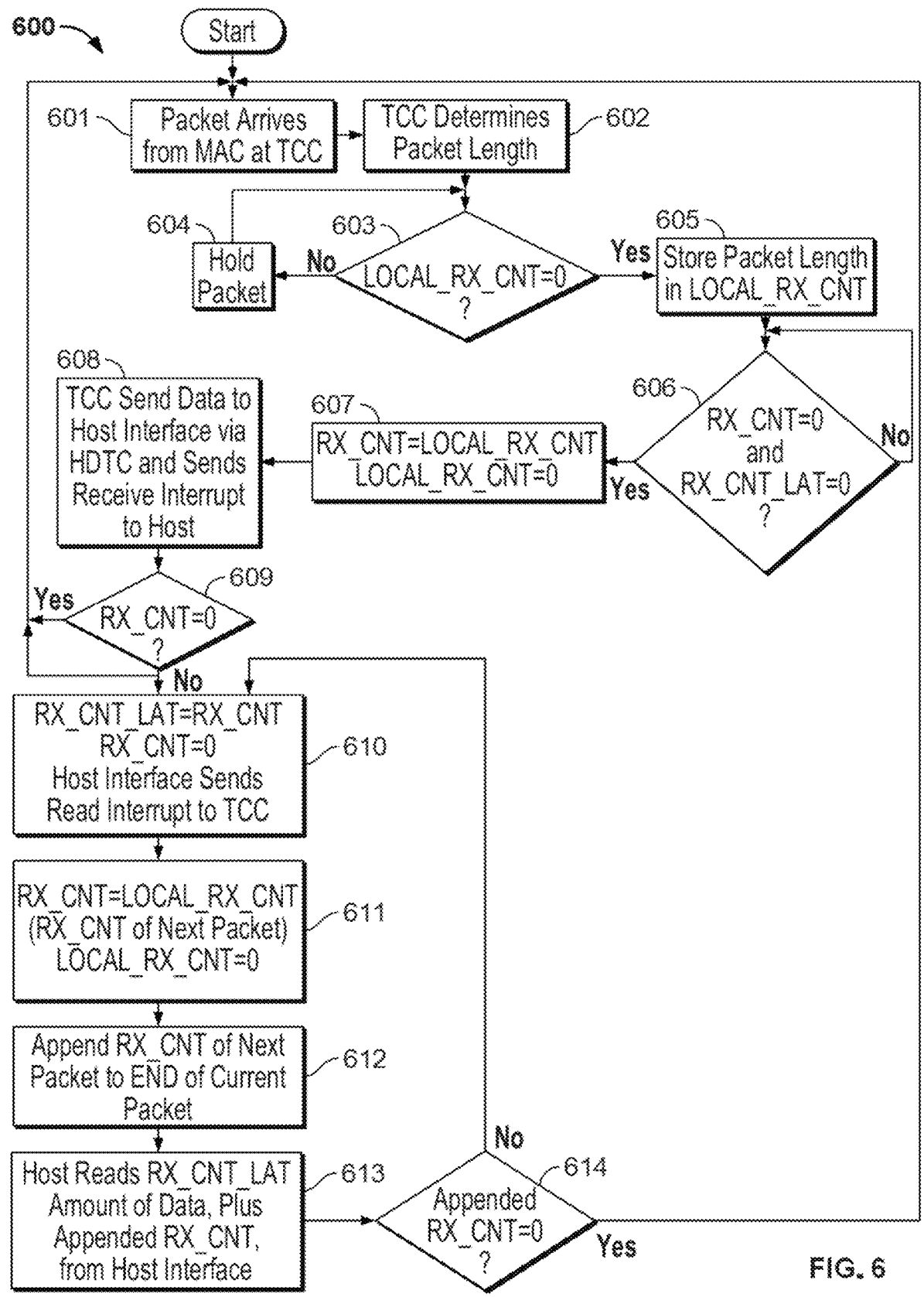
FIG. 6 is a flow diagram showing the operation of a transceiver in accordance with implementations of the subject matter of this disclosure in the receive direction, such as in the wireless data transceiver of FIG. 1.

One example of such an implementation of operation 500 in the receive direction is diagrammed in FIGS. 5 and 6. As seen in FIG. 5, transport controller circuitry 102 includes a register for a local receive counter 501 (LOCAL_RX_CNT), while host interface 104 includes registers for a receive counter 502 (RX_CNT) and a latched receive counter 503 (RX_CNT_LAT). Those three registers or variables 501, 502, 503, are initialized to zero.

As seen in FIG. 6, when a newly-received packet arrives from MAC 101 at 601, transport controller circuitry 102 determines at 602 the length of the newly-received packet. At 603, it is determined whether the local receive counter LOCAL_RX_CNT 501 is currently equal to zero (if LOCAL_RX_CNT 501 is not currently equal to zero, that means there is another received packet waiting to be processed). If not, at 604 the packet is held until local receive counter LOCAL_RX_CNT 501 is equal to zero. If, or when, at 603 it is determined that the local receive counter LOCAL_RX_CNT 501 is equal to zero, then at 605 the length of the received packet is stored in local receive counter LOCAL_RX_CNT 501.

Next, at 606, it is determined whether RX_CNT 502 is equal to zero (meaning that host interface 104 has completed the processing the previous received packet), and RX_CNT_LAT 503 is equal to zero (meaning that the host is not currently reading a packet from host interface 104). If not, the system waits until RX_CNT 502 and RX_CN_LAT 503 are both equal to zero (meaning that host interface 104 has completed the processing the previous received packet), and then at 607 transport controller circuitry 102 writes the value in LOCAL_RX_CNT 501 into RX_CNT 502, resets LOCAL_RX_CNT 501 to zero after writing its value into RX_CNT 502. At 608, transport controller circuitry 102 sends the received packet to host interface 104 via hardware data transport circuitry 103, and generates a receive interrupt 410 to the host (so the host knows it can read from host interface 104).

At 609, it is determined whether the value in RX_CNT 502 is zero. If so, then there is no data to read and flow returns to 601. If, at 609, the value in RX_CNT 502 is not zero, then at 610 the value in RX_CNT 502 is latched into RX_CN_LAT 503, the value in RX_CNT 502 is set to zero, and host interface 104 sends a read interrupt to transport controller circuitry 102. At 611, the value in RX_CNT 502 is set to the value in LOCAL_RX_CNT 501 (i.e., the length of the next packet), and the value in LOCAL_RX_CNT 501 is reset to zero (to await the arrival of another packet). At 612, the value of the length of the next packet as now stored in RX_CNT 502 is appended to the end of the current packet.

At 613, the host reads, from host interface 104, an amount of data indicated by RX_CN_LAT 503 (so that it reads the entire current packet), plus the appended value of RX_CNT 502. At 614, it is determined whether the appended value of RX_CNT 502, as just read from the end of the current packet, is zero. If not, flow returns to 610 for the next packet. If at 614, it is determined that the appended value of RX_CNT 502, as just read from the end of the current packet, is zero, then the current burst of packets is over, and flow returns to 601 to await another burst of packets.

Thus, in receive mode, constant signaling is not required between packets as long as packets continue to arrive. The length of each new packet will be appended to a current packet which will trigger the reading of that new packet without any further exchange of signals or interrupts.

Thus it is seen that a system and method including handling of incoming and outgoing data packets in a wireless transceiver, with reduced signaling overhead, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A wireless data transceiver comprising:
   a media access controller configured to receive an inbound data packet from an air interface and to transfer the inbound data packet for transport to a host, and to receive an outbound data packet and to transfer the outbound data packet to the air interface;
   a host interface configured to receive the inbound data packet transported from the media access controller and to transfer the inbound data packet to the host, and to receive the outbound data packet from the host for transfer to the media access controller;
   transport controller circuitry configured to manage the wireless data transceiver, the transport controller circuitry comprising processing circuitry configured to execute instructions; and
   hardware data transport circuitry for transporting the inbound data packet from the media access controller to the host interface, and for transporting the outbound data packet from the host interface to the media access controller, the hardware data transport circuitry comprising a buffer memory having a plurality of buffer slots for storing data received from the host interface for transfer to the media access controller, and for storing data received from the media access controller for transfer to the host interface; wherein:

transfer of data in either direction between the hardware data transport circuitry and the host interface is controlled by start/continue signals and stop signals issued to the host interface by one of the transport controller circuitry and the hardware data transport circuitry;

responsive to one of the start/continue signals, the hardware data transport circuitry and the host interface begin a transfer of data in a respective one of (a) a direction from the buffer memory to the host interface, and (b) a direction from the host interface to the buffer memory, and transfer multiple data packets;

responsive to one of the stop signals, the hardware data transport circuitry and the host interface end the transfer of data in the respective one of (a) the direction from the buffer memory to the host interface, and (b) the direction from the host interface to the buffer memory;

when the transfer of data is in the direction from the host interface to the buffer memory:
  the start/continue signal is a start signal that is a near-empty signal signifying that at least a first predetermined number of buffer slots are empty, and
  the stop signal is a near-full signal signifying that at most a second predetermined number of buffer slots are empty, the second predetermined number being less than the first predetermined number; and when the transfer of data is in the direction from the buffer memory to the host interface:
  the one of the transport controller circuitry and the hardware data transport circuitry issues, as the one of the start/continue signals, a continue signal to indicate receipt of a packet at the wireless data transceiver, the continue signal being appended to a received packet being transferred by the hardware data transport circuitry to the host interface, signifying that a following packet has a non-zero packet length, and
  the one of the transport controller circuitry and the hardware data transport circuitry issues, as the one of the stop signals, a signal, appended to a received packet being transferred by the hardware data transport circuitry to the host interface, signifying that a following packet has a zero packet length.

2. The wireless data transceiver of claim 1 wherein the host interface is configured to operate in accordance with a protocol compatible with a Secure Digital Input Output (SDIO) host device.

3. The wireless data transceiver of claim 1 wherein, when data packets transferred from the host interface to the buffer memory before issuance of the near-full signal arrive after issuance of the near-full signal, the host interface stops the transfer of data when the buffer memory is filled.

4. The wireless data transceiver of claim 1 wherein after arrival of the near-full signal, the host interface transfers at most a further amount of data sufficient to fill the second predetermined number of buffer slots to capacity, and then stops transferring data.

5. The wireless data transceiver of claim 1 wherein, after transfer of data packets from the host interface to the buffer memory is stopped upon arrival of the near-full signal, the host interface resumes transfer of data packets from the host to the buffer memory on subsequent arrival of the near-empty signal.

6. The wireless data transceiver of claim 1 wherein the one of the transport controller circuitry and the hardware data transport circuitry issues at least one of (a) the near-empty signal, and (b) the near-full signal, as an interrupt.

7. A method of operating a wireless data transceiver including a media access controller, transport controller circuitry, hardware data transport circuitry, and a host interface, the method comprising:

for an outbound data packet:
receiving the outbound data packet at the host interface, and
transferring the outbound data packet from the host interface to the media access controller via the hardware data transport circuitry, including storing the outbound data packet in a buffer slot in a buffer memory of the hardware data transport circuitry, the buffer memory having a plurality of buffer slots for storing data received from the host interface, wherein:
the transferring the outbound data packet from the host interface to the media access controller via the hardware data transport circuitry, and the storing the outbound data packet in a buffer slot in the buffer memory comprise issuing by the hardware data transport circuitry, as a start signal to the host interface, a near-empty signal signifying that at least a first predetermined number of buffer slots are empty, and continuing transfer of one or more data packets, until issuance, by the hardware data transport circuitry to the host interface, as a stop signal that indicates that further transfer should cease, of a near-full signal signifying that at most a second predetermined number of buffer slots are empty, the second predetermined number being less than the first predetermined number; and for an inbound data packet:
receiving the inbound data packet at the media access controller,
transferring the inbound data packet from the media access controller to the host interface via the hardware data transport circuitry, including storing the inbound data packet in at least one of the buffer slots in the buffer memory of the hardware data transport circuitry, wherein:
the transferring the inbound data packet from the buffer memory to the host interface comprises:
  issuing, by the hardware data transport circuitry, as a continue signal to the host interface, to indicate receipt of a packet at the wireless data transceiver to be read by the host interface, a signal signifying that a following packet has a non-zero packet length, wherein issuance of the signal signifying that the following packet has the non-zero packet length comprises appending the signal, signifying that the following packet has the non-zero packet length, to a received packet being transferred by the hardware data transport circuitry to the host interface, and
  continuing transfer of one or more data packets, until issuance, by the hardware data transport circuitry, as a stop signal to the host interface that indicates that further transfer should cease, of a signal signifying that a following packet has a zero packet length, wherein issuance of the signal signifying that a following packet has the zero packet length comprises appending the signal, signifying that the following packet has the zero packet length, to a received packet being transferred by the hardware data transport circuitry to the host interface.

8. The method of claim 7 further comprising, after arrival of the near-full signal, transferring by the host interface at most a further amount of data sufficient to fill the second predetermined number of buffer slots to capacity, and then stopping transfer of data.

9. The method of claim 7 further comprising, when data packets transferred from the host interface to the buffer memory before issuance of the near-full signal arrive after issuance of the near-full signal, issuing a further stop signal to stop the transfer of data when the buffer memory is filled.

10. The method of claim 7 further comprising, when transfer of data packets from the host interface to the buffer memory is stopped upon arrival of the near-full signal, resuming transfer of data packets from the host to the buffer memory upon arrival of the near-empty signal.

11. The method of claim 7, comprising issuing at least one of the near-empty signal and the near-full signal as an interrupt.

\* \* \* \* \*